US011818208B1

(12) United States Patent
Bandlamudi et al.

(10) Patent No.: US 11,818,208 B1
(45) Date of Patent: Nov. 14, 2023

(54) ADAPTIVE DATA PROTOCOL FOR IOT DEVICES

(71) Applicant: INTERNATIONAL BUSINESS MACHINES CORPORATION, Armonk, NY (US)

(72) Inventors: Jayachandu Bandlamudi, Guntur (IN); Narayana Aditya Madineni, Ferny Hills (AU); Matthew Green, Ashmore (AU); Xinlin Wang, Irvine, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/817,660

(22) Filed: Aug. 5, 2022

(51) Int. Cl.
*H04L 67/1095* (2022.01)
*G16Y 40/35* (2020.01)

(52) U.S. Cl.
CPC .......... *H04L 67/1095* (2013.01); *G16Y 40/35* (2020.01)

(58) Field of Classification Search
None
See application file for complete search history.

(56) References Cited

U.S. PATENT DOCUMENTS

| 2009/0070456 A1* | 3/2009 | Brown ................... G06Q 30/02 709/224 |
| 2017/0142226 A1* | 5/2017 | De Foy ................. H04L 67/104 |
| 2018/0092151 A1* | 3/2018 | Liu ....................... H04W 24/02 |
| 2018/0137457 A1 | 5/2018 | Sachs |
| 2019/0222594 A1 | 7/2019 | Davis, III |
| 2019/0238483 A1* | 8/2019 | Marichetty ......... H04L 12/4641 |
| 2020/0110589 A1* | 4/2020 | Bequet .................. G06F 16/164 |
| 2020/0310394 A1 | 10/2020 | Wouhaybi |
| 2021/0182859 A1* | 6/2021 | Srinivasa Rao ... G06Q 20/4016 |
| 2021/0373985 A1* | 12/2021 | Gadepalli ............. G06F 11/008 |

(Continued)

FOREIGN PATENT DOCUMENTS

WO    2020227429 A1    11/2020

OTHER PUBLICATIONS

Sicari et al., "Dynamic Policies in Internet of Things: Enforcement and Synchronization", Mar. 2, 2018, IEEE, IEEE Internet of Things Journal (vol. 4, Issue: 6, pp. 2228-2238) (Year: 2018).*

(Continued)

*Primary Examiner* — Davoud A Zand
(74) *Attorney, Agent, or Firm* — Eric W. Chesley

(57) ABSTRACT

Described are techniques for generating an adaptive data protocol for an IoT network having a plurality community networks of IoT devices. The techniques include determining a data synchronization policy associated with Internet of Things (IoT) devices contained in a plurality of community networks within an IoT network. The techniques further include determining a data sharing policy associated with the IoT devices in the IoT network. The techniques further include analyzing transactions of the data synchronization policy and the data sharing policy to identify transactional inefficiencies in the data synchronization policy and the data sharing policy. The techniques further include generating an adaptive data protocol to increase transactional efficiency within the IoT network based on the analyzing of the data synchronization policy and the data sharing policy.

20 Claims, 8 Drawing Sheets

(56) References Cited

U.S. PATENT DOCUMENTS

2023/0185996 A1* 6/2023 Jenrola ................ G06F 21/602
703/22

OTHER PUBLICATIONS

Bloem-Reddy, et al., "Random Walk Models of Network Formation and Sequential Monte Carlo Methods for Graphs", Journal of the Royal Statistical Society: Series B (Statistical Methodology), vol. 80, Jul. 7, 2018, 40 pgs., arXiv:1612.06404v2.

Mell et al., "The NIST Definition of Cloud Computing", National Institute of Standards and Technology, Special Publication 800-145, Sep. 2011, 7 pages.

Petroni, et al., "Adaptive Data Synchronization Algorithm for IoT-Oriented Low-Power Wide-Area Networks", Sensors 2018, MDPI, Nov. 20, 2018, 21 pgs., <http://dx.doi.org/10.3390/s18114053>.

Ramkumar, et al., "Multi-Adaptive Routing Protocol for Internet of Things based Ad-hoc Networks", Wireless Personal Communications, Apr. 22, 2021, 23 pgs., <https://doi.org/10.1007/s11277-021-08495-z>.

* cited by examiner

ADAPTIVE DATA PROTOCOL FOR IOT DEVICES

BACKGROUND

The present disclosure relates to managing an Internet of Things (IoT) network and, more particularly, to optimizing transactional data flows within the IoT network.

Generally, an IoT network integrates a distributed network of "things" into an information technology infrastructure. A "thing" in the IoT network can comprise a device (IoT device) having one or more sensors that generate data and transmit the data to other nodes in the IoT network. The IoT devices can be distributed over a relatively broad area. For example, IoT devices can be distributed throughout a residential, commercial, and/or industrial structure to monitor various activities and/or environmental factors within the structures. In some scenarios, a large number of IoT devices can operate across multiple operations using data synchronization and data sharing policies applied to the IoT devices located within the IoT network.

SUMMARY

Aspects of the present disclosure are directed toward a computer-implemented method comprising determining a data synchronization policy associated with IoT devices contained in a plurality of community networks within an IoT network, where the data synchronization policy specifies at least one action to perform based in part on a transactional data flow within the IoT network. The method further comprises determining a data sharing policy associated with the IoT devices in the IoT network, where the data sharing policy specifies what data from an IoT device is provided within the IoT network. The method further comprises analyzing transactions of the data synchronization policy and the data sharing policy to identify transactional inefficiencies in the data synchronization policy and the data sharing policy. The method further comprises generating an adaptive data protocol to increase transactional efficiency within the IoT network based on the analyzing of the data synchronization policy and the data sharing policy.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
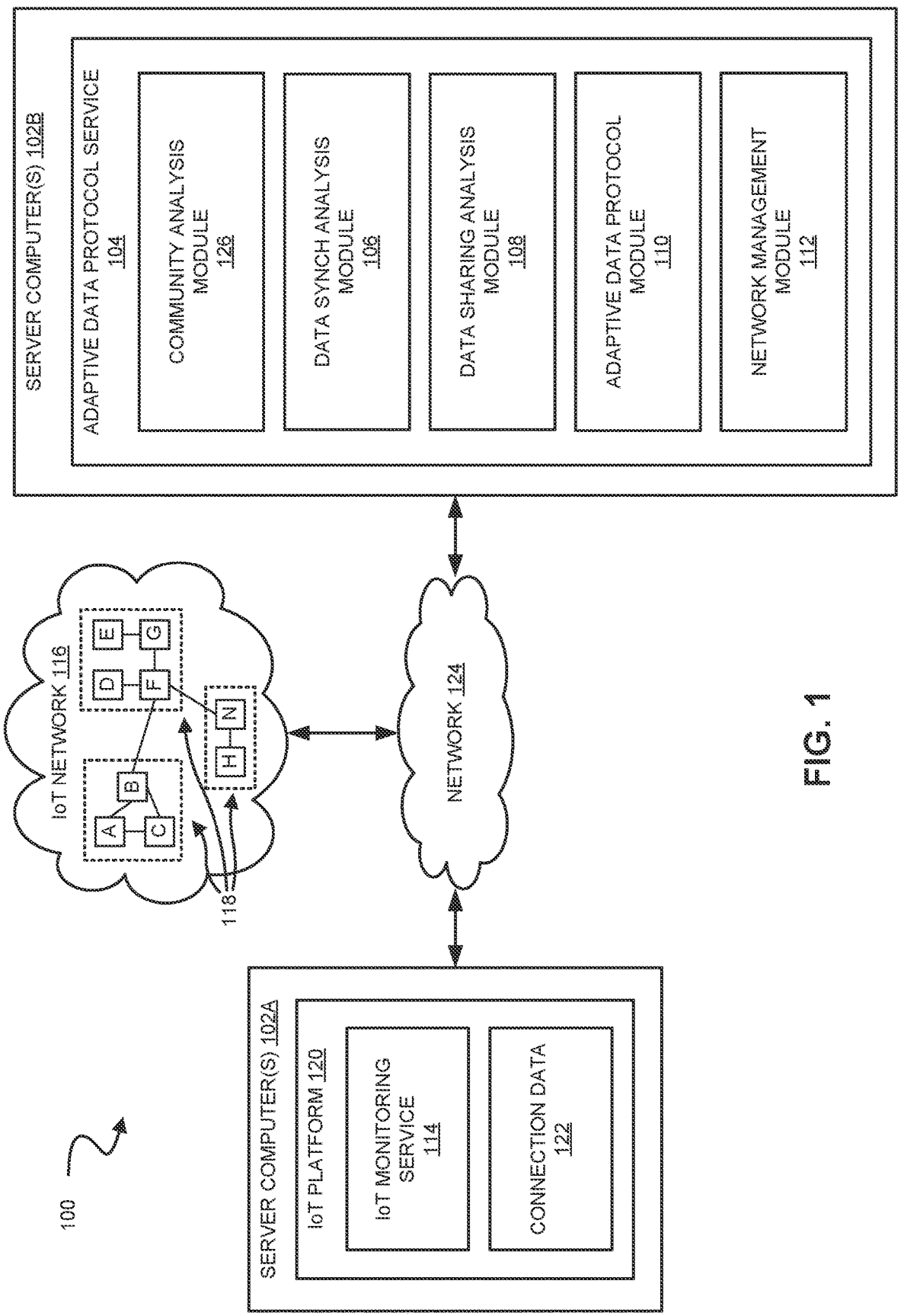
FIG. 1 is a block diagram illustrating an example computational environment implementing an adaptive data protocol service, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward adaptive data protocols for an IoT network having a plurality community networks of IoT devices. While not limited to such applications, embodiments of the present disclosure may be better understood in light of the aforementioned context.

Many industries use a network of IoT devices to monitor their operations and perform actions associated with their operations. As an illustration, a company can use data generated by IoT devices to support or perform operations such as procurement, warehousing, manufacturing, business management, and employee management. The IoT devices can belong to different communities of networks included within a larger IoT network. These community networks can correspond to the company's operations, such as a procurement network, a warehousing network, a manufacturing network, a business management network, and an employee management network. The IoT devices can generate and send data to an IoT platform, where the data can be processed, and one or more actions can be performed in response to the processing of the data.

An IoT network that has a large number of IoT devices belonging to various communities can utilize data synchronization policies to establish data consistency between the various components (e.g., IoT devices, edge devices, platforms, services, and systems) of the IoT network. The data synchronization policies can include both intra-community and inter-community data synchronization policies. An intra-community data synchronization policy applies to transactional data flows between IoT devices included in a same community network. An inter-community data synchronization policy applies to transactional data flows between IoT devices located in different community networks.

An IoT network can experience problems when a data synchronization policy is not optimized. For example, a non-optimized data synchronization policy can cause an IoT device to activate at the wrong time, or not activate at all. For example, a non-optimized synchronization policy can cause a second IoT device included in a chain of IoT devices to not receive data from a first IoT device in the chain, such that data from the first IoT device is not sequentially sent down the chain of IoT devices and an action not being performed as intended by the synchronization policy.

Along with data synchronization policies, an IoT network can utilize data sharing policies to reduce data redundancy within the IoT network. The data sharing policies can include both intra-community and inter-community data sharing polices. An intra-community data sharing policy seeks to minimize data sharing within a community network of IoT devices. An inter-community data sharing policy seeks to minimize data sharing between community networks.

When a data sharing policy is not optimized, unneeded data may be shared with components of an IoT network. For example, an IoT device that generates a fixed payload of data can send the data to IoT devices, services, applications, etc. within and outside of the IoT device's community network. The recipients of the fixed payload may only require a subset of the data. As such, each recipient may receive redundant data that may be stored locally and thereby occupy storage space that could be used for other purposes. Moreover, storing the redundant data by a recipient in the IoT network may have consequences related to data privacy and data security.

Advantageously, aspects of the present disclosure overcome these challenges described above using an adaptive data protocol that optimizes data synchronization policies and data sharing policies used in an IoT network. More specifically, aspects of the present disclosure determine current data synchronization policies using machine learning and determine data sharing polices utilized by the IoT network. Aspects of the present disclosure can then analyze the data synchronization and data sharing policies to identify transactional inefficiencies in the policies. Thereafter, aspects of the present disclosure can generate an adaptive data protocol using updated data synchronization and data sharing policies that increase transactional efficiency within the IoT network based on the analyzing of the data synchronization and the data sharing policies.

As an example advantage, aspects of the present disclosure improve data synchronization within the IoT network by: identifying transactional inefficiencies in a current data synchronization policy; optimizing the data synchronization policy to address the transaction inefficiencies; and encoding the optimized data synchronization policy in an adaptive data protocol. As another example advantage, aspects of the present disclosure improve data utilization and reduce data redundancy within an IoT network by: identifying transactional inefficiencies in a current data sharing policy; optimizing the data sharing policy to limit the data shared within the IoT network to only include data required by a recipient in the IoT network; and encoding the optimized data sharing policy in an adaptive data protocol. As yet another example advantage, aspects of the present disclosure can dynamically reconfigure an IoT network by identifying an IoT device that is not complying with an adaptive data protocol and perform one or more of the following configuration actions: update the configuration of the IoT device to correspond to the adaptive data protocol, generate an alert indicating that the IoT device has failed or that the IoT device is malfunctioning, and/or perform a failover to a backup IoT device. As evident in the following discussion, aspects of the present disclosure provide additional advantages to those described above.

Referring now to the figures, FIG. 1 illustrates a block diagram of an example computational environment 100 that implements an adaptive data protocol service 104, in accordance with some embodiments of the present disclosure. As illustrated, the computational environment 100 can include a plurality of server computers 102A-B hosting the adaptive data protocol service 104 and other aspects utilized by the adaptive data protocol service 104, including an IoT platform 120, an IoT monitoring service 114, and IoT connection data 122. In some embodiments, the adaptive data protocol service 104 and/or the IoT platform 120 can be hosted in a cloud computing environment, which is described in greater detail in association with FIGS. 7 and 8.

The computational environment 100 also includes an IoT network 116. The IoT network 116 is a network of IoT devices (shown as A-N in FIG. 1), also referred to as "connected devices", that have sensors, data processing ability, software, and/or other technologies. The IoT devices can exchange data with other devices, applications, services, and/or systems. As illustrated, the IoT network 116 includes a plurality of community networks 118. A community network 118 comprises a subnetwork of IoT devices or an IoT device group. A community network 118 can be created within the larger IoT network 116 to monitor various operations (e.g., warehousing operations, manufacturing operations, security operations, etc.) and perform actions associated with the operations. An IoT device belonging to a community network 118 can be configured to connect to other IoT devices, edge devices, services, etc. within the community network 118 (intra-community connections) and/or connect to other IoT devices, edge devices, services, etc. outside of the IoT device's community network 118 (inter-community connections).

The IoT devices are in network communication with an IoT platform 120, which establishes connections between the IoT devices and various other devices, applications, services, and/or systems. The IoT platform 120 can comprise a suite of components that enable: deployment of applications that monitor, manage, and control IoT devices; remote data collection from IoT devices; and independent and secure connectivity between IoT devices. The suite of components may include, but are not limited to, a hardware architecture, an operating system, a runtime library, one or more edge devices, and/or containerized workloads.

Figure 2:
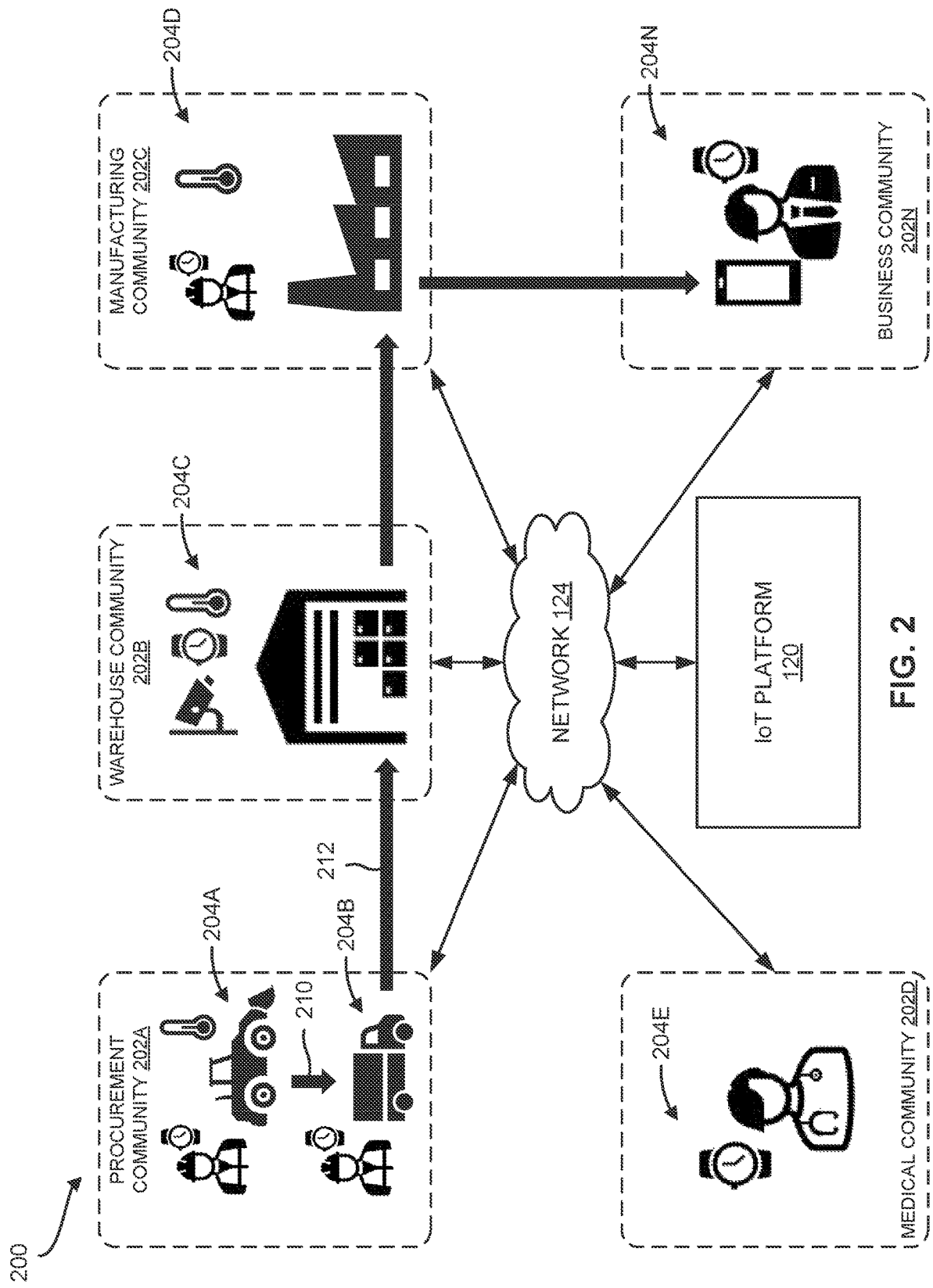
FIG. 2 is a diagram of an example IoT network that includes a plurality of community networks of IoT devices.

As an illustration, FIG. 2 illustrates a non-limiting example of an IoT network 200 that includes a number of community networks 202A-N of IoT devices in network communication with the IoT platform 120. The IoT devices 204A-N within a community network 202A-N can monitor the operations of a company (e.g., a mining company) and perform actions associated with the operations. The IoT devices 204A-N can be configured for intra-community connections and inter-community connections. An intra-community connection 210 allows an IoT device (e.g., IoT devices 204A associated with an earthmover) to exchange data with another IoT device (e.g., IoT devices 204B associated with a truck) included in a same community network 202A-N (e.g., a procurement community 202A). An inter-community connection 212 allows an IoT device 204A-N located in a community network 202A-N (e.g., IoT devices 204B associated with a truck located in a procurement community 202A) to exchange data with another IoT device 204A-N located in a different community network 202A-N (e.g., IoT devices 204C located in a warehouse community 202B).

Returning to FIG. 1, the IoT computer platform 120 can include an IoT monitoring service 114 configured to monitor IoT device communications and store connection data 122 associated with the communications in a data store. The connection data 122 can include audit logs, device logs, and other relevant information. The audit logs can contain information about device settings, cloud-to-device configurations, device registry settings, data access records, application programming interface (API) call records, and the like. The device logs can contain information about device connections (including intra-community and inter-community connections), errors, and other lifecycle events. For example, consider an application configured to maintain lighting in a storage yard using a combination of sensor data from IoT devices comprising a camera, lighting sensor, and a rain sensor. The IoT devices send messages containing the sensor data to the IoT platform 120 to make the sensor data available to the application, which in-turn evaluates the sensor data (lighting and rain measurements) and connection attributes extracted from the messages (e.g., device identifiers, connection timestamps, etc.), and the application sends an action (e.g., increase lighting intensity) to an IoT smart light. The IoT monitoring service 114 can monitor the communications exchanged between the application and IoT devices and capture connection data 122 associated with the communications. The connection data 122, as described below, can be used by the adaptive data protocol service 104 to determine, at least in part, data synchronization and data sharing policies for IoT devices in the IoT network 116, which can provide a basis for generating an adaptive data protocol for the IoT devices.

As shown in FIG. 1, the adaptive data protocol service 104 can include a community analysis module 126, a data synch analysis module 106, a data sharing analysis module 108, an adaptive data protocol module 110, a network management module 112, and other modules as can be appreciated. In some embodiments, the modules can be implemented as computing services hosted in a computing service environment. For example, a module can be considered a service with one or more processes executing on a server or other computer hardware. Such services can provide a service application that receives requests and provides output to other services or consumer devices. An API can be provided for each module to enable a first module to send requests to and receive output from a second module. Such APIs can also allow third parties to interface with the module and make requests and receive output from the modules.

The community analysis module 126 identifies community networks 118 contained within an IoT network 116. In some embodiments, community networks 118 in an IoT network 116 can be defined at the time a set of IoT devices is deployed in the IoT network 116, and the community analysis module 126 can obtain information for the community networks 118 from a device or system registry. In other embodiments, the community analysis module 126 can analyze connection data 122 collected by the IoT monitoring service 114 (as well as other data related to the IoT network 116) to identify a set of IoT devices that form a community network 118 using attributes of the IoT devices. The attributes can include device attributes (e.g., sensor type, physical location, etc.), connection attributes (e.g., data type, data send frequency, etc.), data flow attributes (e.g., sequential/parallel device connections), and other attributes that can be evaluated to determine a relationship between a set of IoT devices that defines a community network 118. For example, the community analysis module 126 can analyze device attributes (e.g., device type and physical location) in combination with connection data 122 indicating a cause-and-effect relationship between a set of IoT devices (e.g., a set of IoT devices that send sensor data in parallel to the IoT platform 120 which causes another IoT device to perform an action) to determine that the set of IoT devices form a community network 118.

The data synch analysis module 106 determines a current data synchronization policy used in an IoT network 116 and analyzes a transactional data flow associated with the current data synchronization policy to identify any inefficiencies that are within the transactional data flow. Generally, data synchronization attempts to establish data consistency between different IoT devices in an IoT network 116, and a data synchronization policy specifies at least one action to perform based in part on a transactional data flow that relies on data consistency among IoT devices.

Data synchronization is a considerable challenge in large IoT networks. Generally, IoT devices are configured manually to handle synchronization with other devices in the IoT network, which can result in transactional inefficiencies due to the complexities associated with massive IoT networks. The data synch analysis module 106 can determine the current data synchronization policies used in an IoT network 116 at the intra-community and inter-community levels and identify any transactional inefficiencies associated with the current data synchronization policies. Identifying these transactional inefficiencies allows adaptive data protocols to be created that address the transactional inefficiencies and increase transactional efficiency within the IoT network 116.

The data synch analysis module 106 can determine both intra-community data synchronization policies and inter-community data synchronization policies for an IoT network 116. An intra-community data synchronization policy specifies an action(s) to perform based in part on a transactional data flow among IoT devices located within a same community network 118 (e.g., a policy that turns on an IoT light located in a storage yard in response to data from an IoT sensor also located in the storage yard). An inter-community data synchronization policy specifies an action(s) to perform based in part on a transactional data flow between IoT devices located in different community networks 118 (e.g., a policy to move materials from a warehouse to manufacturing in response to data sent from an IoT procurement device located in a manufacturing network to an IoT inventory device located in a warehouse network).

The data synch analysis module 106 can determine an intra-community data synchronization policy for a community network 118 by analyzing historical connection data 122 to identify an intra-transactional data flow associated with IoT devices included in a same community network 118. The data synch analysis module 106 can determine an inter-community data synchronization policy by analyzing historical connection data 122 to identify an inter-transactional data flow associated with IoT devices belonging to different community networks 118. In some embodiments, the data synch analysis module 106 can use machine learning to determine the data synchronization policies. Also, in some embodiments, because historical connection data 122 may not provide a transactional data flow for every possible communication among the IoT device in an IoT network 116, the data synch analysis module 106 can simulate transactional data flows within the IoT network 116, and the data synch analysis module 106 can use both the transactional data flows obtained from the connection data 122 and the transaction data flows obtained from the simulation to determine a data synchronization policy for the IoT network 116. An example of a method that can be used by the data synch analysis module 106 to determine data synchronization policies is described later in association with FIG. 3.

The data sharing analysis module 108 determines a current data sharing policy associated with an IoT device and analyzes how the data is used within the IoT network 116 to identify inefficiencies in the data sharing policy. A data sharing policy for an IoT device can specify how data generated by the IoT device is provided within an IoT network 116.

Generally, IoT devices provide a fixed payload of data to other components in an IoT network 116. For example, a smart watch can provide a fixed payload of sensor data, such as heart rate data, blood pressure data, blood oxygen data, step count data, accelerometer data, barometer data, location data, and the like to an IoT platform 120. The data included in the fixed payload may be more than what is needed by an application, service, or system that receives the fixed payload. For example, a medical service may only need a subset of the data that is medically relevant to a patient (e.g., heart rate data, blood pressure data, blood oxygen data), the additional data in the fixed payload may not be relevant, and therefore superfluous. In an IoT network 116, minimal data sharing is preferred as it avoids the potential risk with data security and privacy. Accordingly, the data sharing analysis module 108 can identify data sharing inefficiencies in current data sharing policies to allow adaptive data protocols to be created that address the data sharing inefficiencies to reduce superfluous sharing of data within the IoT network 116.

Unnecessary data from IoT devices can be propagated within a single community network 118, as well as across different community networks 118. As such, the data sharing analysis module 108 can determine both intra-community data sharing policies and inter-community data sharing policies in the IoT network 116. More specifically, the data sharing analysis module 108 can determine an intra-community data sharing policy for a community network 118 by identifying similar community networks 118 and compare data attributes at the community level. The data sharing analysis module 108 can determine an inter-community data sharing policy between community networks 118 by comparing data attributes of similar devices within and outside of the community networks 118. An example of a method that can be used by the data synch analysis module 106 to determine data sharing policies is described later in association with FIG. 4.

The adaptive data protocol module 110 generates an adaptive data protocol for the IoT network 116 to increase transactional efficiency within the IoT network 116 based on the inefficiencies identified in the current data synchronization and data sharing policies. For example, the inefficiencies identified by the data synch analysis module 106 and the data sharing analysis module 108 can provide a basis for generating an adaptive data protocol that addresses the deficiencies associated with the current data synchronization and data sharing policies. The adaptive data protocol module 110 updates aspects of the current data synchronization policies to improve data consistency between IoT devices in the IoT network 116 and updates aspects of the current data sharing policies to avoid superfluous data sharing within the IoT network 116. The adaptive data protocol module 110 then encodes the updated data synchronization and data sharing policies into the adaptive data protocol, which can then be applied to the IoT devices in the IoT network 116.

As a non-limiting example applied to a manufacturer's IoT network, the adaptive data protocol module 110 can update a first data synchronization policy to check for data synchronization in a sequential data flow between a procurement volume sensor located in a procurement network, a warehouse volume sensor located in a warehouse network, and a pre-processing device located in a manufacturing network prior to activating the pre-processing device. A second synchronization policy can be updated to check for data synchronization in a parallel data flow from a vision sensor, light detection sensor, and rain sensor located in a storage yard network prior to activating a light device located in the storage yard network. A data sharing policy can be updated to only share medical sensor data from a smart watch with the manufacturer's health operations, and only share environmental and location sensor data with the manufacturer's safety operations. The adaptive data protocol module 110 can then generate an adaptive data protocol for the manufacturer's IoT network using the updated policies above. The adaptive data protocol can then be applied to the manufacturer's IoT network by determining, for each IoT device, a policy in the adaptive data protocol that corresponds to the IoT device and applying the policy to the IoT device. When a new IoT device is added to the manufacturer's IoT network, a policy in the adaptive data protocol that corresponds to the new IoT device can be determined and applied to the new IoT device.

The network management module 112 performs various actions associated with an adaptive data protocol. As an example, after an adaptive data protocol is generated, the network management module 112 can apply policies included in the adaptive data protocol to each respective IoT device in the IoT network 116. As another example, the network management module 112 can update configurations of community networks 118 to correspond to the policies in the adaptive data protocol.

In some embodiments, the network management module 112 monitors the IoT network 116 to identify IoT devices which do not comply with the adaptive data protocol. In the case that an IoT device is identified as not complying with the adaptive data protocol, the network management module 112 performs one or more actions, such as updating a configuration of the IoT device to correspond to a policy in the adaptive data protocol, generating an alert indicating that the IoT device is misconfigured, malfunctioning, or failed. In the case that an IoT device is malfunctioning or has failed, the network management module 112 can identify another IoT device having attributes that correspond to the respective policy in the adaptive data protocol and perform a failover to the IoT device.

In some embodiments, the network management module 112 monitors the IoT network 116 to determine that an IoT device has been added to the IoT network 116. The network management module 112 then determines whether a policy in the adaptive data protocol corresponds to the IoT device and applies the respective policy to the IoT device. In some embodiments, the network management module 112 can validate expected policies against the policies in the adaptive data protocol to determine whether the expected policies meet the user's requirements (e.g., ensuring minimal sharing of data across IoT devices and community networks 118).

As shown in FIG. 1, a network 124 can be provided to enable communication between the components of the computational environment 100. The network 124 can include any useful computing network, including an intranet, the Internet, a local area network, a wide area network, a wireless data network, or any other such network or combination thereof. Components utilized for the network 124 may depend at least in part upon the type of network and/or environment selected. Communication over the network 124 may be enabled by wired or wireless connections and combinations thereof.

Illustratively, the IoT devices included in an IoT network 116 can include, but are not necessarily limited to, one or more mobile devices (e.g., smart phones, smart watches, tablets, laptops, or other types of network connected mobile computing devices), smart appliances (e.g., refrigerators, stoves, microwaves, printers, washing machines, dryers, dishwashers, cooling devices, heating devices, thermostats, lighting devices, medical devices, security devices and/or gaming devices which are connected to one or more networks and configured to transmit and receive data over the one or more networks), connected vehicles (e.g., automobiles, trains, airplanes, helicopters, boats, trucks, vans, motorcycles and/or buses which are connected to one or more networks and configured to transmit and receive data over the one or more networks). The data which is transmitted and/or received can include, but is not necessarily limited to, operational, diagnostic, performance, inventory and/or location data so that the IoT devices can be remotely monitored, analyzed and/or controlled. The IoT devices can include integrated technology, including one or more sensors, so that the IoT devices can communicate and interact by transmitting and receiving data over the one or more networks.

While FIG. 1 illustrates an example of a computational environment that can implement the techniques above, many other similar or different environments are possible. The example environments discussed and illustrated above are merely representative and not limiting.

Figure 3:
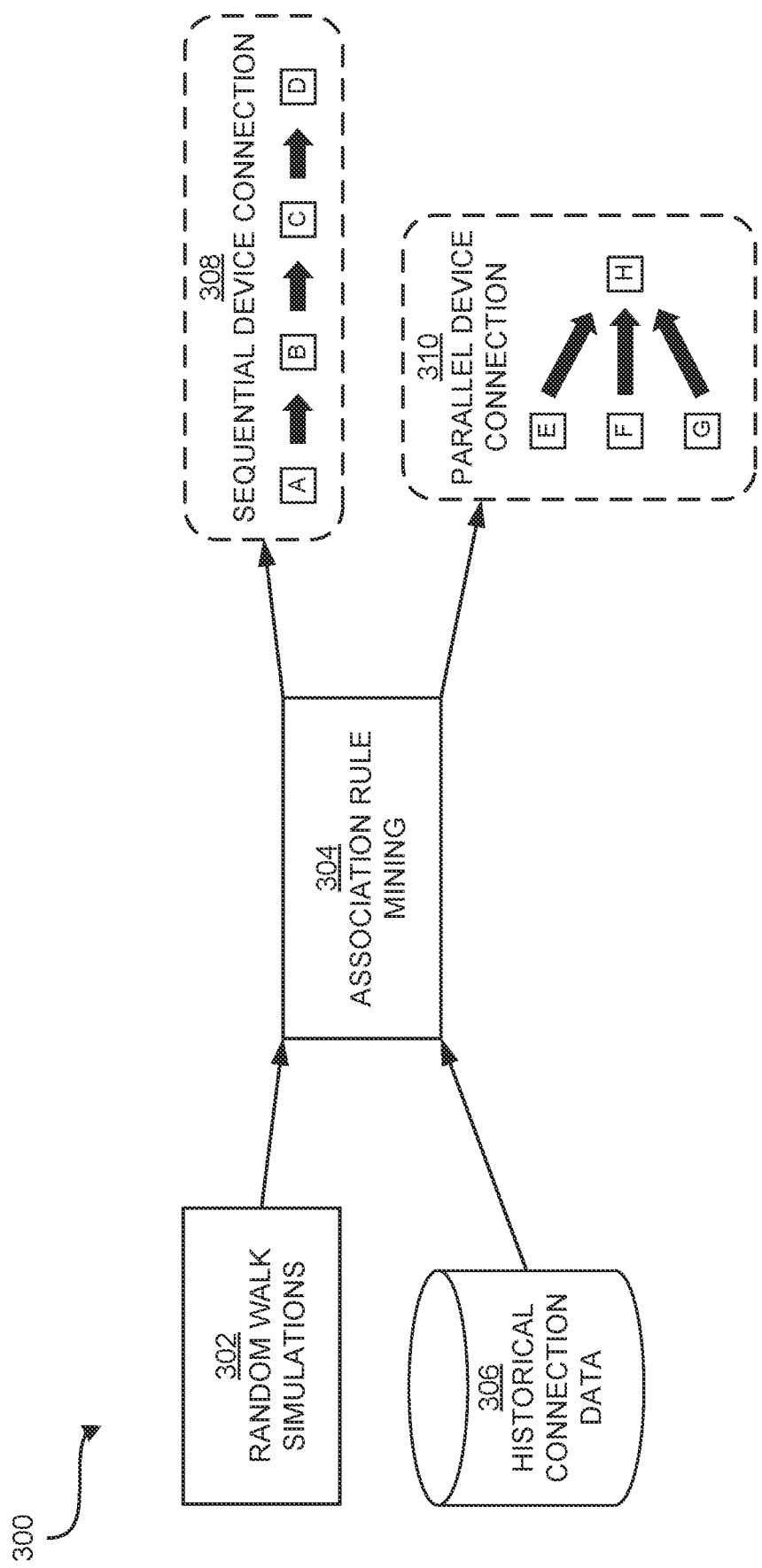
FIG. 3 is a flow diagram illustrating an example method for determining data synchronization policies in an IoT network, in accordance with some embodiments of the present disclosure.

FIG. 3 is a flow diagram illustrating an example method 300 for determining data synchronization policies in an IoT network, in accordance with some embodiments of the present disclosure. The data synchronization policies specify actions to perform based in part on transactional data flows among the IoT devices located within the IoT network. The method 300 determines the data synchronization policies using both historical transactional data flows and simulated transactional data flows.

Because historical connection data 306 for the IoT network may not include data for every possible device interaction in the IoT network, the method 300 simulates transactional data flows among the IoT devices to ensure that possible IoT device connections not contained in the historical connection data 306 are considered. In operation 302, the method 300 generates simulated connection data for the IoT network using a machine learning model to perform random walk simulations. In some embodiments, the IoT network can be represented as a graph with multiple edges and the method 300 first identifies a central IoT device for each device type included in the IoT network using a normalized page rank technique. This step identifies the central devices in the IoT network that are tightly connected. After identifying the central devices, the method 300 utilizes unsupervised machine learning to simulate device connections via a random walk technique with the central devices as pivots. The random walk simulation can comprise a stochastic process that determines a path between a central device in the IoT network using a succession of random steps between the IoT devices. For example, a one-dimensional random walk technique can simulate traversals between nodes of the graph and a Misra-Gries sampling algorithm can be used to identify prominent graph traversals. The machine learning model outputs probable transactional data flows between the IoT devices in the IoT network.

In operation 304, the method 300 uses association rule mining to identify frequent sequential and parallel device connections at both the intra-community and inter-community levels. The method 300 identifies sequential device connections 308 using historical and simulated connection data as input to a generalized sequential pattern (GSP) algorithm along with support and confidence metrics to identify robust sequential device data connections. The method 300 identifies parallel device connections 310 using a token replay on graph structure technique that initiates a connection by one IoT device and identifies other IoT devices in the IoT network that are activated at substantially the same time. As part of identifying the sequential and parallel device connections, the method 300 obtains data attributes for each IoT device, which can be referenced when generating an adaptive data protocol. The data synchronization policies determined by the method 300 can be evaluated for inefficiencies, and the data synchronization policies can be optimized and encoded into an adaptive data protocol for the IoT network, as described earlier in association with FIG. 1.

Figure 4:
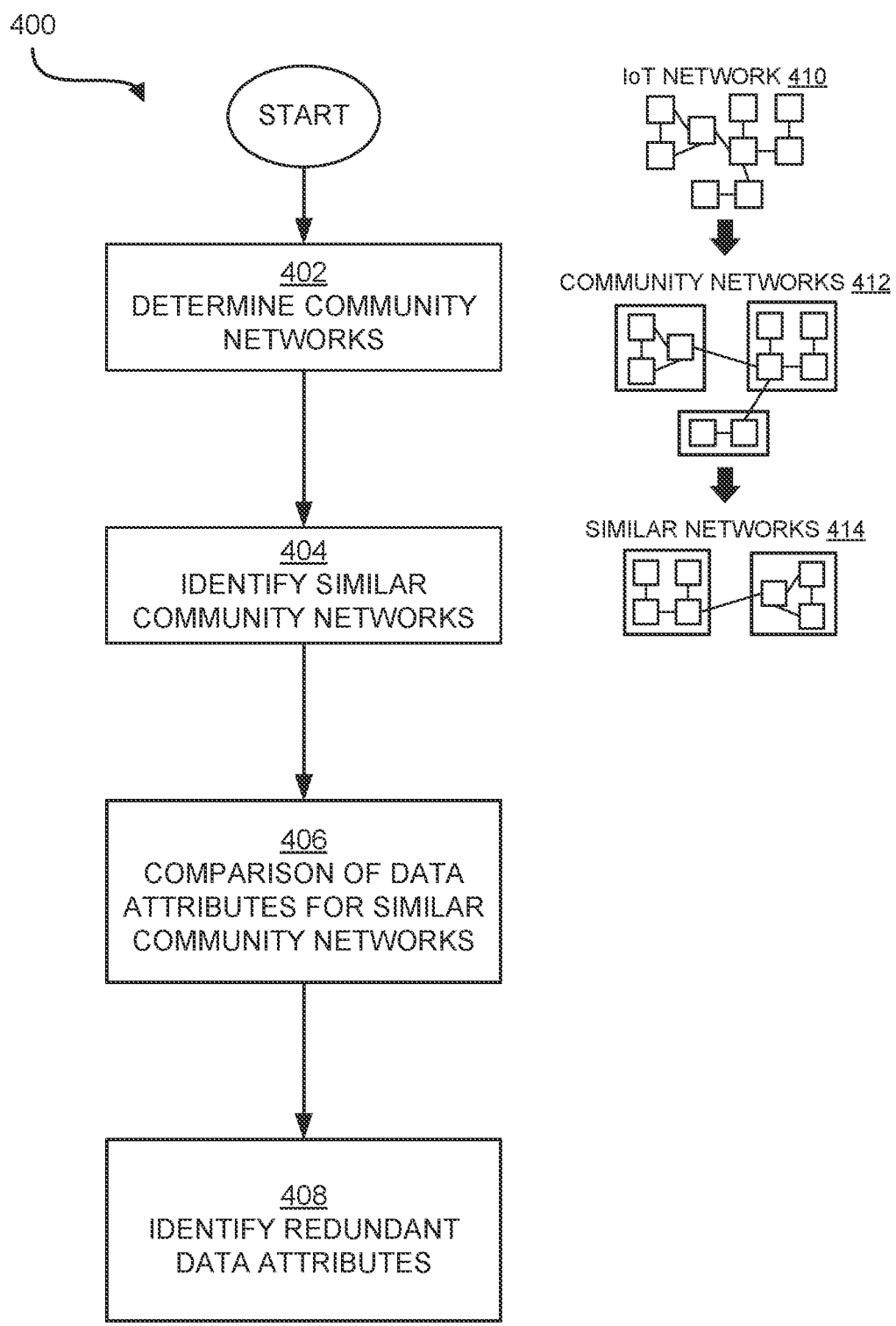
FIG. 4 is a flow diagram that illustrates an example method for determining data sharing policies in an IoT network, in accordance with some embodiments of the present disclosure.

FIG. 4 is a flow diagram illustrating an example method 400 for determining data sharing policies in an IoT network 410, in accordance with some embodiments of the present disclosure. IoT devices generally generate a fixed payload of data and send the data to other components of an IoT network 410. For example, data generated by a smart watch can include heart rate data, blood pressure data, blood oxygen data, step count data, accelerometer data, barometer data, location data, and the like. However, only a subset of the data may be relevant to a process (e.g., environment monitoring process, a health monitoring process, etc.) that receives the fixed payload of data. Because minimal data sharing is preferred in an IoT network 410 to promote data security and data privacy, and because data from an IoT device can be propagated within a single community network and across community networks included in the IoT network 410, determining the data sharing policies at the device level, the community network level, and the IoT platform level is needed to address redundant data sharing within the IoT network 410.

Accordingly, in operation 402, the method 400 uses representations of the IoT network 410 to determine community networks 412 contained within the IoT network 410. In some embodiments, the method 400 can determine the community networks 412 by obtaining information (e.g., community network labels) from a device or system registry. In other embodiments, the method 400 can analyze connection data associated with the IoT devices to determine the community networks 412 using attributes of the IoT devices.

In operation 404, the method 400 identifies other community networks 414 that are similar in nature. For example, the method 400 uses attributes of a community network 412 (e.g., device types, connection data, etc.) to identify other community networks 414 that have similar attributes. In some embodiments, graph representation and unsupervised machine learning can be used to identify similar community networks 414. For example, the machine learning technique can use a Weisfeiler-Lehman Hashing algorithm to iteratively aggregate and hash neighborhoods of each node. After each node's neighbors have been hashed to obtain updated node labels, a hashed histogram of resulting labels can be returned as the final hash.

In operation 406 the method 400 compares the data attributes of the community networks 412 and 414 to identify redundant data attributes, as in operation 408 To identify redundant device data attributes at the community level, the method 400 employs a frequent pattern mining technique with support and confidence metrics. Frequent pattern mining comprises an analytical process that finds frequent patterns, associations, or causal structures from data sets found in databases and other data repositories. Given a set of data connection transactions, the frequent pattern mining technique attempts to identify data sharing policies at the community level. As a non-limiting example, device data attributes generated by sensors in a smartwatch can be assigned the following confidence values.

| Sensor Data | Community | Confidence |
| --- | --- | --- |
| Blood Pressure, Heart Rate, Step Count | Medical | 1 |
| Step Count, Stress Metrics | Business | 1 |
| Blood Pressure, Heart Rate | Business | 0 |

As shown in the first and second rows of the table above, the confidence values of "1" assigned to the sensor data indicates a high confidence that the device data attributes are relevant to the communities (e.g., health device attributes are relevant to a medical community and job performance device attributes are relevant to a business community). As shown in the last row of the table above, the confidence value of "0" assigned to the health-related sensor data indicates that the device data attributes are irrelevant to the business community as there is low confidence for the association between health device attributes and performing a business task.

A data sharing policy assigned a low confidence score can be identified as sharing redundant or unnecessary data. After identifying redundant data sharing in a data sharing policy, the data sharing policy can be optimized, and the optimized data sharing policy can be encoded into an adaptive data protocol for the IoT network 410, as described earlier in association with FIG. 1.

Figure 5:
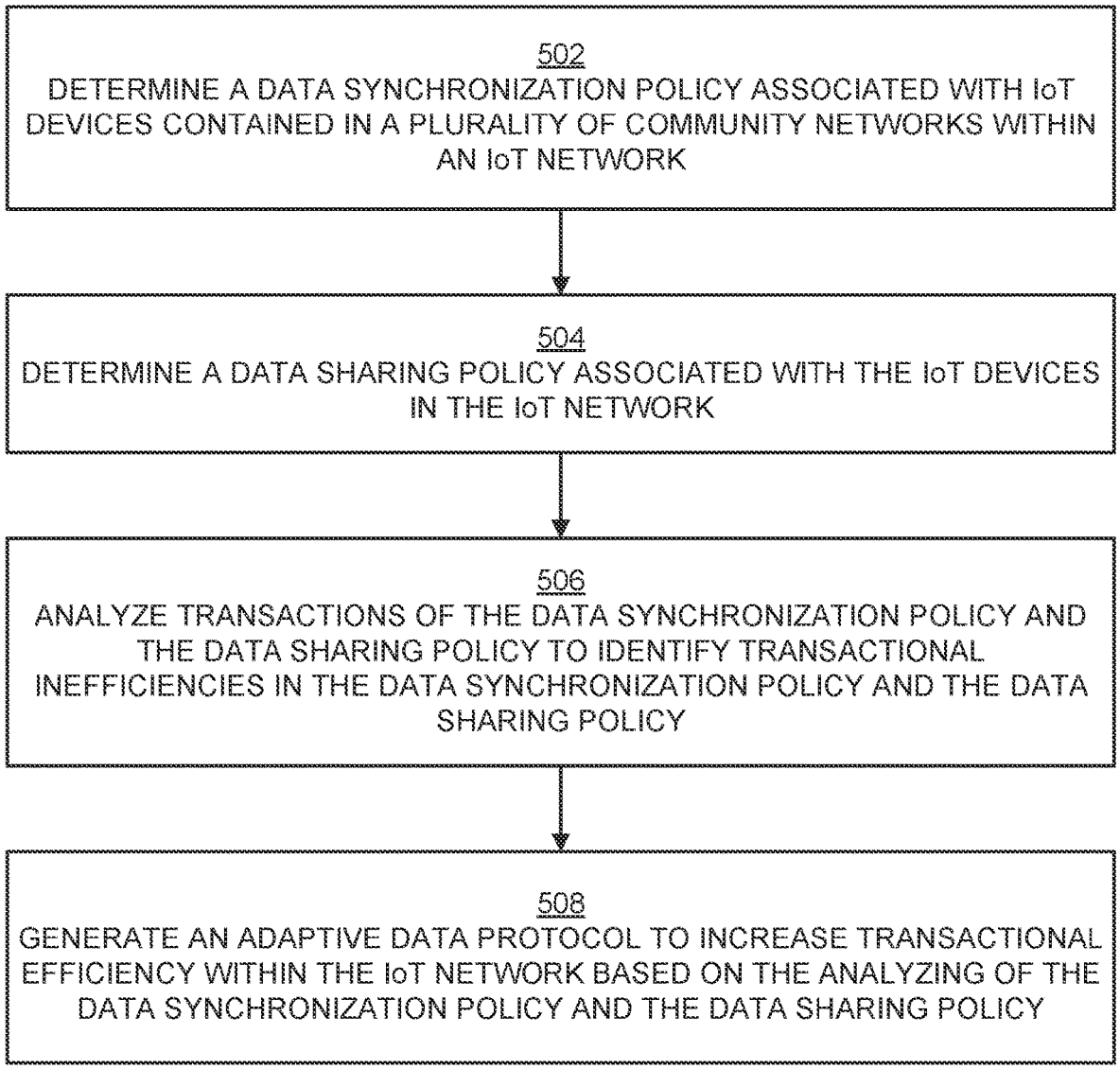
FIG. 5 is a flow diagram illustrating an example method for generating an adaptive data protocol that increases transactional efficiency within an IoT network, in accordance with some embodiments of the present disclosure.

FIG. 5 is a flow diagram that illustrates an example method 500 for generating an adaptive data protocol that increases transactional efficiency within an IoT network, in accordance with some embodiments of the present disclosure. In some embodiments, the method 500 can be performed by a computer system, such as the computer depicted in FIG. 6. In some embodiments, the method 500 can be performed in a cloud computing environment, such as the cloud computing environment depicted in FIGS. 7 and 8. Moreover, in some embodiments, the method 500 can generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

In operation 502, the method 500 determines a data synchronization policy associated with IoT devices contained in a plurality of community networks within an IoT network. Generally, data synchronization attempts to establish data consistency between different IoT devices in an IoT network, and a data synchronization policy specifies at least one action to perform based in part on a transactional data flow that relies on data consistency among IoT devices.

A transactional data flow associated with a data synchronization policy is a parallel data flow, which comprises indications (e.g., sensor data) from a set of IoT devices sent in parallel to cause an action to be performed (e.g., activate a light when both rain and darkness are detected). As such, determining a data synchronization policy can further comprise identifying a parallel transactional data flow associated with performing an action.

Also, a transactional data flow associated with a data synchronization policy can be a sequential data flow, which comprises a sequence of data transactions between a set of IoT devices (e.g., device1→device2→device3) that results in an action being performed. Therefore, determining a data synchronization policy can further comprise identifying a sequential transactional data flow associated with performing an action.

Additionally, a transactional data flow can be contained within a community network or can be between two or more community networks. Therefore, determining a data synchronization policy can further comprise analyzing connection data to identify intra-transactional data flows within a community network, as well as analyzing connection data to identify inter-transactional data flows between a plurality of community networks.

In some embodiments, a transactional data flow in the IoT network can be simulated to determine, at least in part, a data synchronization policy that may not be evident by analyzing historical connection data for the IoT network. For example, as described earlier, transactional data flows among the IoT devices can be simulated to ensure that possible IoT device connections not contained in the historical connection data are considered when generating an adaptive data protocol.

In operation 504, the method 500 determines a data sharing policy associated with the IoT devices in the IoT network. The data sharing policy specifies what data from an IoT device is provided within the IoT network. In some embodiments, determining the data sharing policy includes performing frequent pattern mining of a transactional data flow associated with an IoT device to identify redundant data from the IoT device provided within the IoT network.

In operation 506, the method 500 analyzes transactions of the data synchronization policy and the data sharing policy to identify transactional inefficiencies in the data synchronization policy and the data sharing policy. Identifying these transactional inefficiencies allows adaptive data protocols to be created that address the transactional inefficiencies and increase transactional efficiency within the IoT network.

In operation 508, the method 500 generates an adaptive data protocol to increase transactional efficiency within the IoT network based on the analyzing of the data synchronization policy and the data sharing policy. The inefficiencies identified in the data synchronization and data sharing policies can provide a basis for generating the adaptive data protocol. For example, the current data synchronization policy can be updated to improve data consistency between IoT devices in the IoT network. The current data sharing policy can be updated to avoid superfluous data sharing within the IoT network. The method 500 can encode the updated data synchronization and data sharing policies into the adaptive data protocol.

In some embodiments, the method 500 can also apply the adaptive data protocol to each respective IoT device in the IoT network. Thereafter, the IoT network can be monitored to identify IoT devices that are added to the IoT network, and the adaptive data protocol can be applied to the newly added IoT device. Also, the IoT network can be monitored to identify IoT devices that do not comply with the adaptive data protocol, and in response to identifying a non-complying IoT device, an action can be performed, such as updating settings of the IoT device to correspond to the adaptive data protocol, generating an alert indicating that the IoT device has failed or that the IoT device is malfunctioning, and/or performing a failover to a backup IoT device. Also, the adaptive data protocol can be used to validate expected policies to determine whether they meet a user's requirements and share minimal data across IoT devices and community networks.

Figure 6:
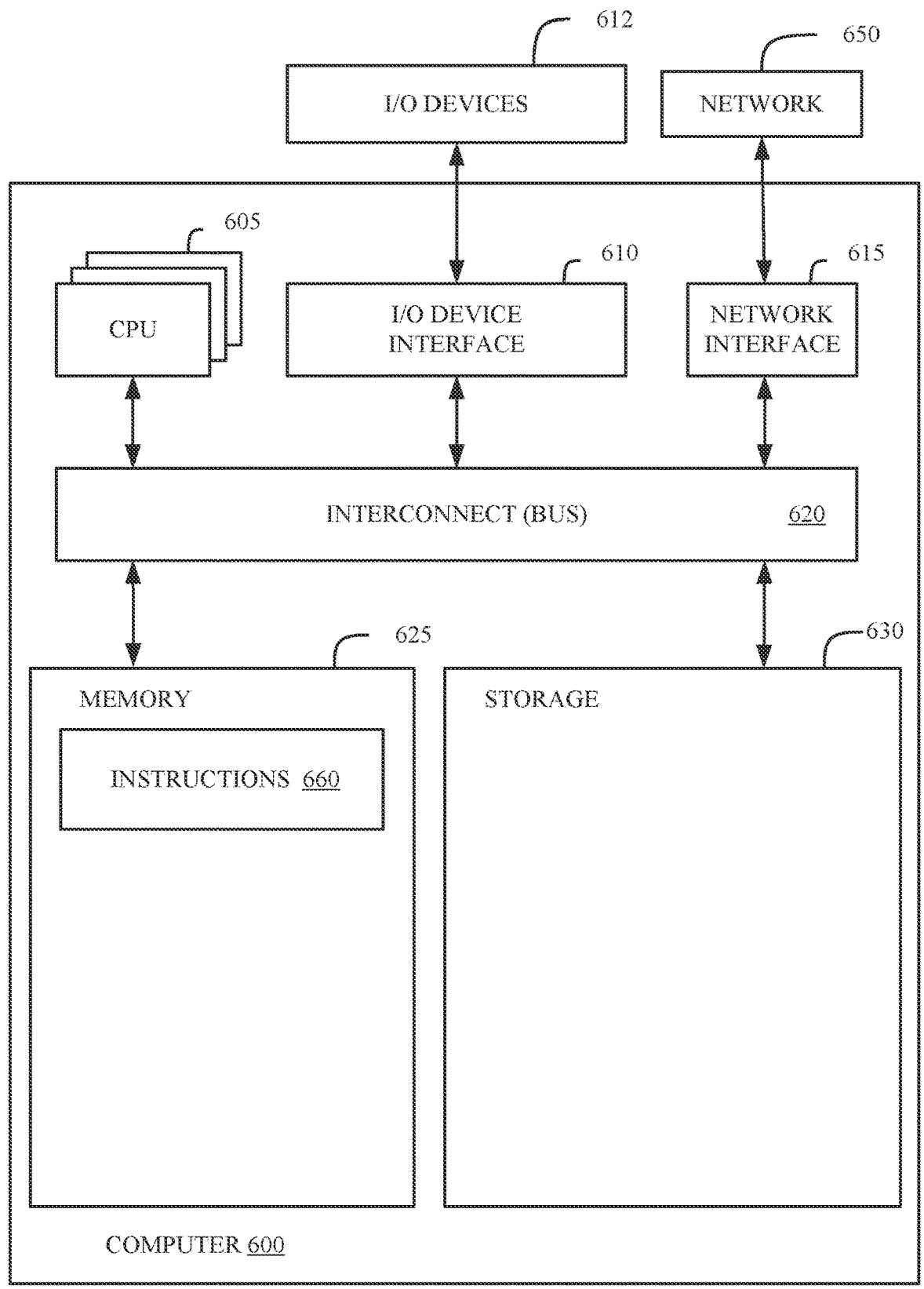
FIG. 6 is a block diagram of illustrating an example computer, in accordance with some embodiments of the present disclosure.

FIG. 6 illustrates a block diagram of an example computer 600 in accordance with some embodiments of the present disclosure. In various embodiments, computer 600 can perform any or all portions of the methods earlier and/or implement the functionality discussed earlier. In some embodiments, computer 600 receives instructions related to the aforementioned methods and functionalities by downloading processor-executable instructions from a remote data processing system via network 650. In other embodiments, computer 600 provides instructions for the aforementioned methods and/or functionalities to a client machine (e.g., the adaptive data protocol service 104 of FIG. 1) such that the client machine executes the method, or a portion of the method, based on the instructions provided by computer 600. In some embodiments, the computer 600 is incorporated into (or functionality similar to computer 600 is virtually provisioned to) one or more entities illustrated in FIG. 1 and/or other aspects of the present disclosure.

Computer 600 includes memory 625, storage 630, interconnect 620 (e.g., a bus), one or more CPUs 605 (also referred to as processors herein), I/O device interface 610, I/O devices 612, and network interface 615.

Each CPU 605 retrieves and executes programming instructions stored in memory 625 or storage 630. Interconnect 620 is used to move data, such as programming instructions, between the CPUs 605, I/O device interface 610, storage 630, network interface 615, and memory 625. Interconnect 620 can be implemented using one or more buses. CPUs 605 can be a single CPU, multiple CPUs, or a single CPU having multiple processing cores in various embodiments. In some embodiments, CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random-access memory (e.g., static random-access memory (SRAM), dynamic random-access memory (DRAM), or Flash). Storage 630 is generally included to be representative of a non-volatile memory, such as a hard disk drive, solid state device (SSD), removable memory cards, optical storage, or flash memory devices. In an alternative embodiment, storage 630 can be replaced by storage area-network (SAN) devices, the cloud, or other devices connected to computer 600 via I/O device interface 610 or network 650 via network interface 615.

In some embodiments, memory 625 stores instructions 660. However, in various embodiments, instructions 660 are stored partially in memory 625 and partially in storage 630, or they are stored entirely in memory 625 or entirely in storage 630, or they are accessed over network 650 via network interface 615.

Instructions 660 can be computer-readable and computer-executable instructions for performing any portion of, or all of, the methods described earlier and/or implement the functionality discussed earlier. Although instructions 660 are shown in memory 625, instructions 660 can include program instructions collectively stored across numerous computer-readable storage media and executable by one or more CPUs 605.

In various embodiments, I/O devices 612 include an interface capable of presenting information and receiving input. For example, I/O devices 612 can present information to a user interacting with computer 600 and receive input from the user.

Computer 600 is connected to network 650 via network interface 615. Network 650 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
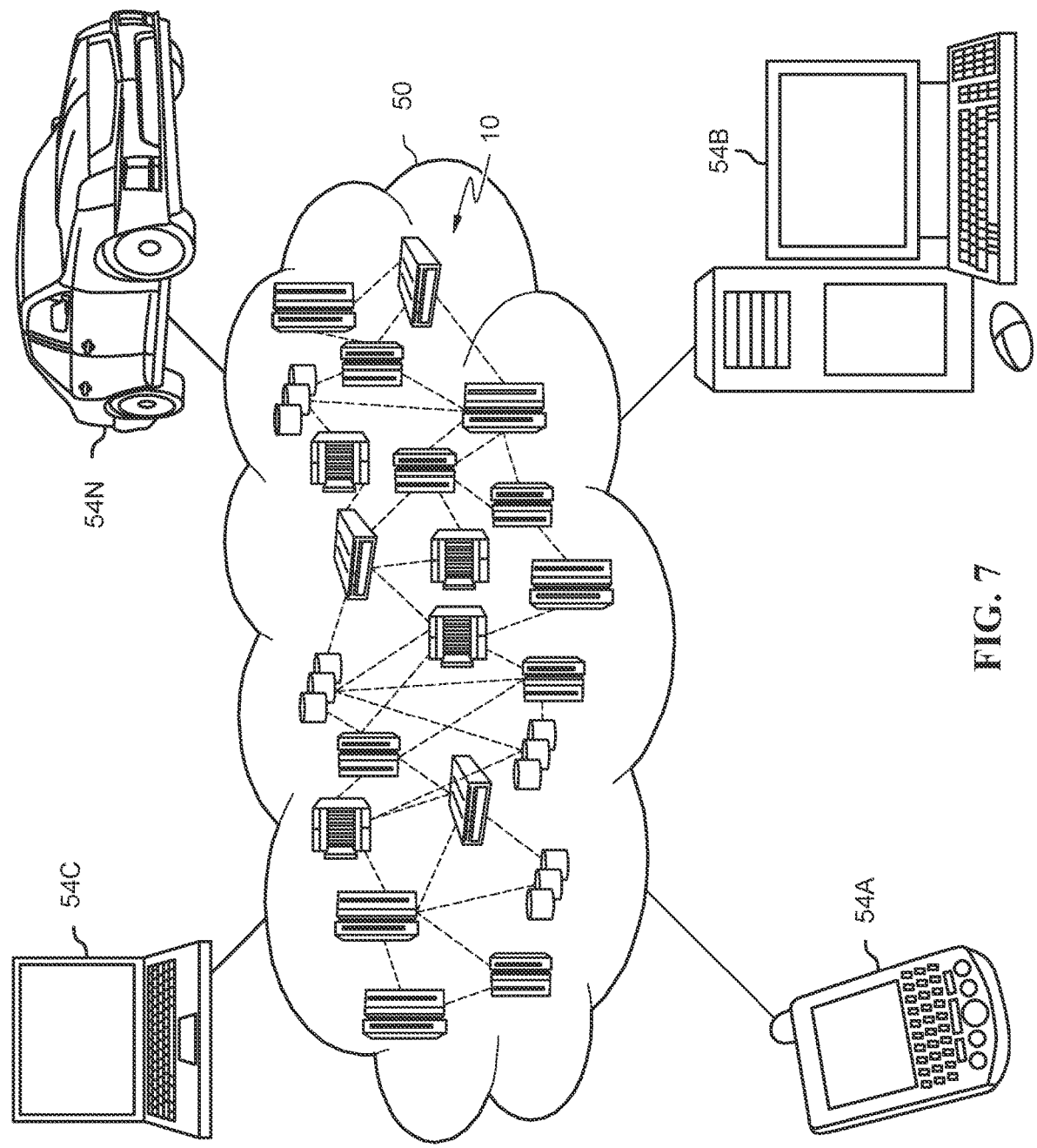
FIG. 7 depicts an example cloud computing environment, in accordance with some embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
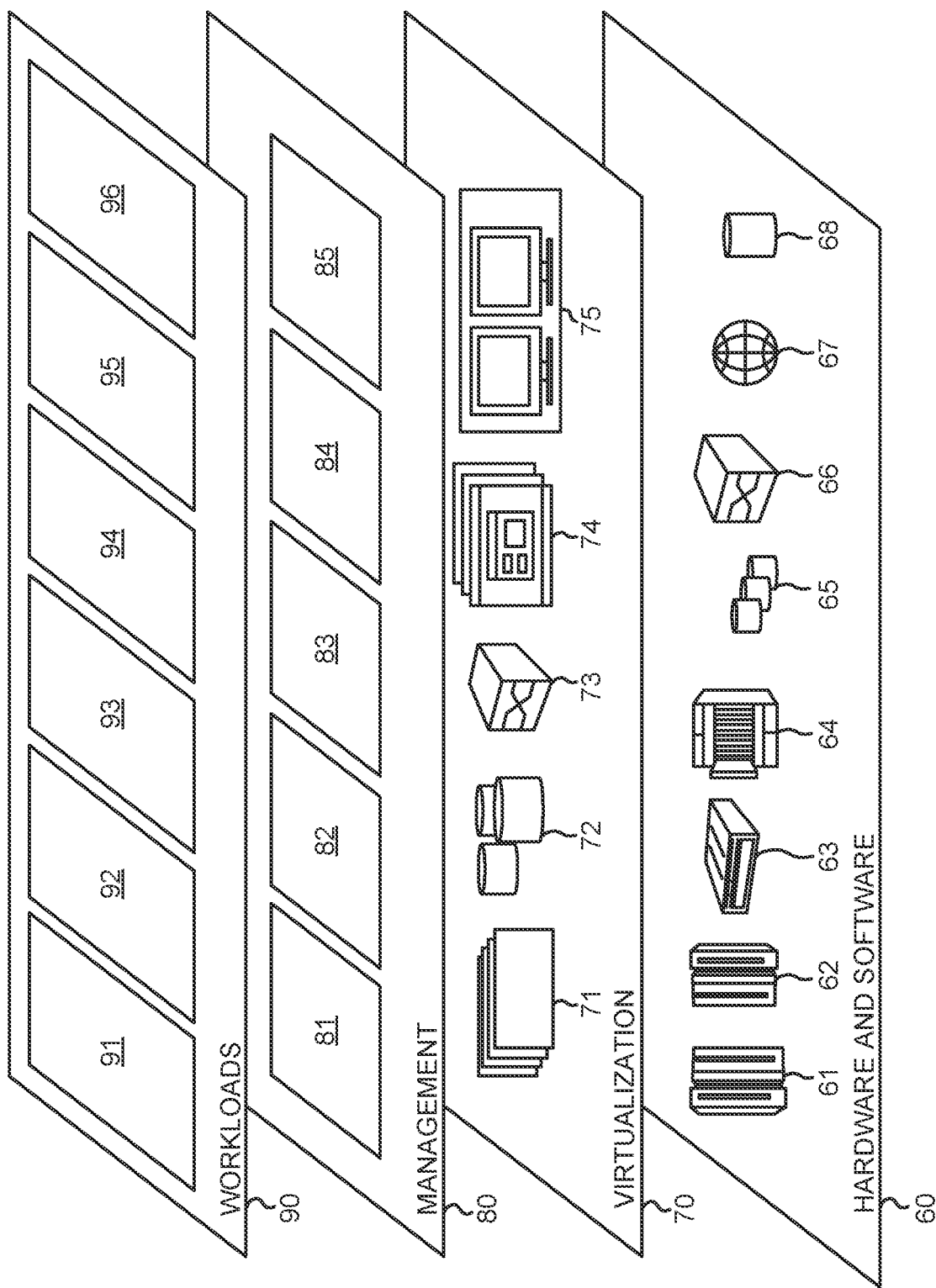
FIG. 8 depicts example abstraction model layers, in accordance with some embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and IoT adaptive data protocol determination and implementation 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any portion of the methods described with respect to FIGS. 3, 4, and/or 5 and/or implement the functionality discussed in FIG. 1 can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A computer-implemented method comprising:
    determining a data synchronization policy associated with Internet of Things (IoT) devices contained in a plurality of community networks within an IoT network using historical transactional data flows associated with the IoT devices, and by simulating transactional data flows in the IoT network to identify possible transactional data flows not contained in the historical transactional data flows,
    wherein the data synchronization policy specifies at least one action to perform based in part on a transactional data flow within the IoT network;
    determining a data sharing policy associated with the IoT devices in the IoT network, wherein the data sharing policy specifies what data from an IoT device is provided within the IoT network;
    analyzing transactions of the data synchronization policy and the data sharing policy to identify transactional inefficiencies in the data synchronization policy and the data sharing policy; and
    generating an adaptive data protocol to increase transactional efficiency within the IoT network based on the analyzing of the data synchronization policy and the data sharing policy.

2. The computer-implemented method of claim 1, wherein determining the data synchronization policy further comprises analyzing intra-transactional data flows within a community network and inter-transactional data flows between the plurality of community networks.

3. The computer-implemented method of claim 1, wherein determining the data synchronization policy further comprises:
    identifying a parallel transactional data flow associated with performing an action, wherein the action is performed in response to receiving, in parallel, indications from a set of the IoT devices; or
    identifying a sequential transactional data flow associated with performing an action, wherein the action is performed in response to a sequence of transactions between the set of IoT devices.

4. The computer-implemented method of claim 1, wherein the simulating transactional data flows in the IoT network further comprises using a machine learning model to simulate the transactional data flows in the IoT network.

5. The computer-implemented method of claim 1, wherein determining the data sharing policy further comprises performing frequent pattern mining of a transactional data flow associated with the IoT device to identify redundant data from the IoT device provided within the IoT network.

6. The computer-implemented method of claim 1, further comprising applying the adaptive data protocol to each respective IoT device in the IoT network.

7. The computer-implemented method of claim 1, further comprising:
monitoring the IoT network to identify IoT devices that are added to the IoT network;
determining that an IoT device has been added to the IoT network and that the adaptive data protocol applies to the IoT device; and
applying the adaptive data protocol to the IoT device.

8. The computer-implemented method of claim 1, further comprising:
monitoring the IoT network to identify IoT devices which do not comply with the adaptive data protocol;
determining that an IoT device is not complying with the adaptive data protocol; and
performing at least one action selected from the group consisting of: update a configuration of the IoT device to correspond to the adaptive data protocol, generate an alert indicating that the IoT device has failed or that the IoT device is malfunctioning, and perform a failover to a backup IoT device.

9. A system comprising:
one or more computer readable storage media storing program instructions;
one or more processors which, in response to executing the program instructions, are configured to:
determine a data synchronization policy associated with Internet of Things (I) devices contained in a plurality of community networks within an IoT network using historical transactional data flows associated with the IoT devices, and by simulating transactional data flows in the IoT network to identify possible transactional data flows not contained in the historical transactional data flows,
wherein the data synchronization policy specifies at least one action to perform based in part on a transactional data flow within the IoT network;
determine a data sharing policy associated with the IoT devices in the IoT network, wherein the data sharing policy specifies what data from an IoT device is provided within the IoT network;
analyze transactions of the data synchronization policy and the data sharing policy to identify transactional inefficiencies in the data synchronization policy and the data sharing policy; and
generate an adaptive data protocol to increase transactional efficiency within the IoT network based on the analyzing of the data synchronization policy and the data sharing policy.

10. The system of claim 9, wherein the program instructions configured to cause the one or more processors to determine the data synchronization policy further cause the one or more processors to analyze intra-transactional data flows within a community network and inter-transactional data flows between the plurality of community networks.

11. The system of claim 9, wherein the program instructions configured to cause the one or more processors to determine the data synchronization policy further cause the one or more processors to:
identify a parallel transactional data flow associated with performing an action, wherein the action is performed in response to receiving, in parallel, indications from a set of the IoT devices; or
identify a sequential transactional data flow associated with performing an action, wherein the action is performed in response to a sequence of transactions between the set of IoT devices.

12. The system of claim 9, wherein the simulating transactional data flows in the IoT network is performed using a machine learning model.

13. The system of claim 9, wherein the program instructions configured to cause the one or more processors to determine the data synchronization policy further cause the one or more processors to perform frequent pattern mining of a transactional data flow associated with the IoT device to identify redundant data from the IoT device provided within the IoT network.

14. The system of claim 9, wherein the program instructions are further configured to cause the one or more processors to:
monitor the IoT network to identify IoT devices that are added to the IoT network;
determine that an IoT device has been added to the IoT network and that the adaptive data protocol applies to the IoT device; and
apply the adaptive data protocol to the IoT device.

15. The system of claim 9, wherein the program instructions are further configured to cause the one or more processors to:
monitor the IoT network to identify IoT devices which do not comply with the adaptive data protocol;
determine that an IoT device is not complying with the adaptive data protocol; and
perform at least one action selected from the group consisting of: update a configuration of the IoT device to correspond to the adaptive data protocol, generate an alert indicating that the IoT device has failed or that the IoT device is malfunctioning, and perform a failover to a backup IoT device.

16. A computer program product comprising:
one or more computer readable storage media, and program instructions collectively stored on the one or more computer readable storage media, the program instructions configured to cause one or more processors to:
determine a data synchronization policy associated with Internet of Things (IoT) devices contained in a plurality of community networks within an IoT network using historical transactional data flows associated with the IoT devices, and by simulating transactional data flows in the IoT network to identify possible transactional data flows not contained in the historical transactional data flows,
wherein the data synchronization policy specifies at least one action to perform based in part on a transactional data flow within the IoT network;
determine a data sharing policy associated with the IoT devices in the IoT network, wherein the data sharing policy specifies what data from an IoT device is provided within the IoT network;
analyze transactions of the data synchronization policy and the data sharing policy to identify transactional inefficiencies in the data synchronization policy and the data sharing policy; and
generate an adaptive data protocol to increase transactional efficiency within the IoT network based on the analyzing of the data synchronization policy and the data sharing policy.

17. The computer program product of claim 16, wherein the program instructions configured to cause the one or more processors to determine the data synchronization policy further cause the one or more processors to analyze intra-transactional data flows within a community network and inter-transactional data flows between the plurality of community networks.

18. The computer program product of claim 16, wherein the program instructions configured to cause the one or more processors to determine the data synchronization policy further cause the one or more processors to:
- identify a parallel transactional data flow associated with performing an action, wherein the action is performed in response to receiving, in parallel, indications from a set of the IoT devices; or
- identify a sequential transactional data flow associated with performing an action, wherein the action is performed in response to a sequence of transactions between the set of IoT devices.

19. The computer program product of claim 16, wherein the simulating transactional data flows in the IoT network is performed using a machine learning model.

20. The computer program product of claim 16, wherein the program instructions configured to cause the one or more processors to determine the data synchronization policy further cause the one or more processors to perform frequent pattern mining of a transactional data flow associated with the IoT device to identify redundant data from the IoT device provided within the IoT network.

* * * * *